United States Patent
Watanabe et al.

[11] Patent Number: 5,196,213
[45] Date of Patent: Mar. 23, 1993

[54] EJECTOR MECHANISM IN AN INJECTION MOLDING MACHINE

[75] Inventors: Kikuo Watanabe; Ryuji Tai, both of Oshino; Masaki Muranaka, Tokyo, all of Japan

[73] Assignee: Fanuc Ltd., Minamitsuru, Japan

[21] Appl. No.: 777,362

[22] PCT Filed: Mar. 5, 1991

[86] PCT No.: PCT/JP91/00294
§ 371 Date: Nov. 27, 1991
§ 102(e) Date: Nov. 27, 1991

[87] PCT Pub. No.: WO91/14561
PCT Pub. Date: Oct. 3, 1991

[30] Foreign Application Priority Data
Mar. 29, 1990 [JP] Japan ................ 2-78742

[51] Int. Cl.$^5$ ............................................. B29C 45/40
[52] U.S. Cl. ................................ 425/556; 264/334; 425/444
[58] Field of Search ............... 264/334; 425/554, 556, 425/444

[56] References Cited
FOREIGN PATENT DOCUMENTS

| | | |
|---|---|---|
| 167143 | 10/1983 | Japan . |
| 24311 | 2/1984 | Japan . |
| 173303 | 11/1985 | Japan . |
| 10423 | 1/1986 | Japan . |
| 10825 | 1/1986 | Japan . |
| 28511 | 2/1986 | Japan . |
| 80016 | 4/1987 | Japan . |
| 71722 | 3/1989 | Japan . |
| 68816 | 5/1989 | Japan . |
| 108715 | 7/1989 | Japan . |
| 244816 | 9/1989 | Japan . |
| 19520 | 2/1990 | Japan . |

*Primary Examiner*—Tim Heitbrink
*Attorney, Agent, or Firm*—Staas & Halsey

[57] ABSTRACT

An ejector mechanism which is simple in structure and facilitates the manufacture and assembling thereof, wherein a ball screw-spline shaft (10) of the ejector mechanism has a spline portion (11) fitted into a ball spline nut (20) fixed to a movable platen (1) of an injection molding machine, and a ball screw portion (12) threadedly engaged with a ball nut (30) which is rotatably supported by a casing (40) fixed to the movable platen. The ball nut is coupled to a motor (51) by toothed pulleys (52, 53) respectively secured to the ball nut and the output shaft of the motor, and a timing belt (54) looped round these pulleys. As the ball nut is rotated through motor rotation, the spline portion advances together with the ball screw portion, and a molded article is ejected by the distal end of the spline portion which acts as a molded article-ejecting portion.

3 Claims, 3 Drawing Sheets

EJECTOR MECHANISM IN AN INJECTION MOLDING MACHINE

TECHNICAL FIELD

The present invention relates to an ejector mechanism in an injector molding machine, and more particularly, to an ejector mechanism having a simple structure.

BACKGROUND ART

In general, an injection molding machine is provided with an ejector mechanism for taking out a molded article from a mold. As shown in FIG. 3, by way of example, an ejector mechanism installed in a motor-driven injection molding machine is arranged to drive an ejector pin 10', which extends through a movable platen 1', by means of a drive mechanism 20' including a motor 24', so as to push out a molded article to the outside of a mold. A ball screw 21' of the drive mechanism 20' is screwed into the ejector pin 10', and a ball nut 22' threadedly engaged with the ball screw 21' is rotatably supported by a casing 30' fixed to the movable platen 1' and is coupled to the motor output shaft through a belt 23'. The ejector mechanism further includes a plurality of guide rods 40' extending in parallel with the ejector pin 10', and a guide plate 41' arranged for reciprocal motion between the movable platen 1' and the casing 30' along the rods 40'. The ball screw 21' is securely fixed at a front end thereof to a central portion of the plate 41' by a key 42', so as to be unrotatable. As the motor 24' rotates, the ball nut 22' is rotated, so that the ejector pin 10' is moved toward the mold in unison with the ball screw 21', to thereby push out the molded article.

In the above-mentioned ejector mechanism, it is essentially required to provide the plurality of guide rods 40' and the guide plate 41', in order to accurately move the ejector pin 10' along the ejector axis 100'. This, however, leads to an increased number of parts of the ejector mechanism and to complicated structure. Moreover, these constituent parts of the ejector mechanism must be manufactured and the ejector mechanism must be assembled with such a high precision that the ejector pin 10' and the guide rods 40' are exactly parallel with the axis 100' and at the same time an error in the distance between the axes of adjacent guide rods 40' falls within a stringent allowable range of $\pm 20$–$30\mu$.

DISCLOSURE OF THE INVENTION

The object of the present invention is to provide an ejector mechanism in an injection molding machine which is simple in structure and can be easily manufactured and assembled.

To achieve the above object, according to the present invention, there is provided an ejector mechanism installed in an injection molding machine having a movable platen, which mechanism comprises a ball screw-spline shaft having a ball screw portion, a spline portion integral with the ball screw portion, and a distal end portion extending through the movable platen and serving as a molded article-ejecting portion; a ball nut threadedly engaged with the ball screw portion; a spline nut spline-fitted on the spline portion; and a drive mechanism, wherein one of the ball nut and the spline nut is fixed to the movable platen, and the other of the ball nut and the spline nut is rotatably supported by the movable platen and drivingly coupled to the drive mechanism.

As described above, the ejector mechanism according to the present invention can be constituted by the ball screw-spline shaft, the ball nut, the spline nut, and the drive mechanism, and thus requires lesser parts and is simple in structure, as compared with a conventional ejector mechanism including a guide plate and a plurality of guide rods. Further, since the ball screw-spline shaft is arranged to be supported by the ball nut threadedly engaged therewith and the spline nut fitted thereon, the ball screw-spline shaft can be brought into alignment with the ejector axis by simply disposing these nuts in such a manner that the axes of the nuts are aligned with the ejector axis. Thus, the manufacture and assembling of the ejector mechanism are facilitated. Moreover, since the distal end portion of the ball screw-spline shaft serves as the molded-article ejecting portion, the ejecting portion can be moved along the ejector axis, and thus, an accurate ejector motion can be achieved.

BEST MODE OF CARRYING OUT THE INVENTION

Figure 1:
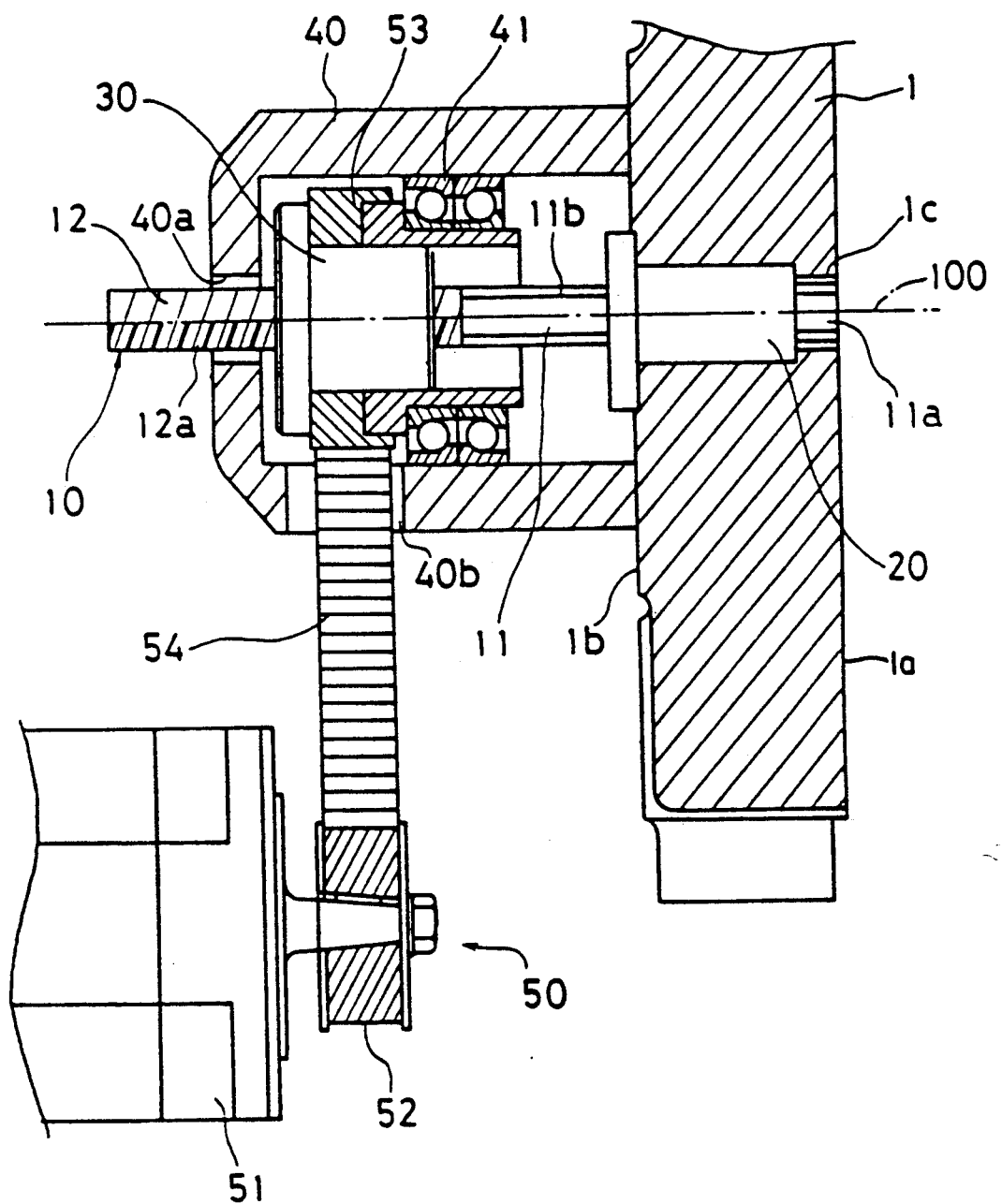
FIG. 1 is a fragmentary front view showing, partly in cross section, part of an ejector mechanism according to a first embodiment of the present invention.

Referring to FIG. 1, an ejector mechanism, according to a first embodiment of the present invention, is mounted to that end face (rear end face) 1b of a movable platen 1 of an injection molding machine which is opposite to a surface 1a thereof to which a mold is attached. The ejector mechanism comprises a ball screw-spline shaft 10, a ball spline nut 20 spline-fitted on the shaft 10, and a ball nut 30 threadedly engaged with the shaft 10. The spline nut 20 is closely fitted into an axial hole 1c which is formed in the movable platen 1 in a manner extending therethrough in alignment with an ejector axis 100, and is securely fixed to the platen 1 such that it is unrotatable and axially immovable relative to the platen 1. The ball nut 30 is supported through bearings 41 by a cylindrical casing 40 fixed to the rear end face 1b of the platen 1, such that it is aligned with the ejector axis 100 and is rotatable but axially immovable relative to the casing 40.

The ball screw-spline shaft 10 consists of a front half (ball spline portion) 11 on which the spline nut 20 is spline-fitted, and a rear half (ball screw portion) 12 with which the ball nut 30 is threadedly engaged. These halves 11 and 12 are supported respectively by the nuts 20 and 30 which are each arranged in alignment with the ejector axis 100, whereby the shaft 10 itself is aligned with the axis 100. The spline portion 11 has an axial length longer than the sum of the wall thickness of the movable platen 1 and the ejector stroke, and extends through the axial hole 1c of the platen 1. A front end 11a of the spline portion 11 serves as a molded article-ejecting portion. The ball screw portion 12 has an axial length longer than the sum of the axial length of the ball nut 30 and the ejector stroke, and is received in an axial hole 40a which is formed in the casing 40 in a manner extending therethrough in alignment with the axis 100. A plurality of axial straight grooves 11b are axially formed in the outer peripheral surface of the spline portion 11, and a plurality of spline teeth (not shown) formed in the inner peripheral surface of the spline nut 20 are slidably fitted in these grooves. Further, a plurality of steel balls (not shown), which are interposed between the spline portion 11 and the spline nut 20, are disposed in the straight grooves 11b for rolling motion. A helical groove 12a is formed on the outer peripheral surface of the ball screw portion 12 for slidable engagement with a thread (not shown) formed on the inner peripheral surface of the ball nut 30. Steel balls, which are interposed between the ball screw portion 12 and the ball nut 30, are disposed in the helical groove. The axis of the helical groove 12a is in alignment with the axis of the shaft 10.

The ejector mechanism further comprises a drive mechanism 50 including an ejector servomotor 51. The motor 51 is fixed to the movable platen 1 by means of a suitable member, not shown, and is arranged to be operated under the control of a numerical control device (not shown) for controlling the operation of various operating parts of the injection molding machine. Toothed pulleys 52 and 53 are firmly attached to the output shaft of the motor 51 and the ball nut 30, respectively, and a timing belt 54 is looped round these pulleys 52 and 53. The timing belt 54 is received in a hole 40b, which is formed at the bottom of the casing 40 in a manner extending through the peripheral wall of the casing 40.

The operation of the ejector mechanism shown in FIG. 1 will be explained.

Various operating parts of the injection molding machine are driven under the control of the numerical control device in a conventional manner, to repeatedly execute an injection molding cycle consisting of a series of processes including mold clamping, metering, kneading, injection, hold, cooling, mold opening, and molded article ejection.

When the molded article ejection process is started in each molding cycle, the ejector motor 51 is rotated in a forward direction under the control of the numerical control device, whereby the ball nut 30, drivingly coupled to the motor 51 through the toothed pulleys 52 and 53 and the timing belt 54, is rotated in the forward direction. As the ball nut 30 rotates, the ball screw portion 12, which is integral with the spline portion 11 unrotatably supported by the movable platen 1 through the spline nut 20, is moved in an axial (forward) direction toward the movable platen 1. At this time, the steel balls interposed between the ball screw portion 12 and the ball nut 30 roll in the helical groove 12a of the ball screw portion along the groove. On the other hand, the spline portion 11, which is integral with the ball screw portion 12, slides along the spline teeth of the spline nut 20 toward the movable platen 1, while causing the steel balls disposed in the straight grooves 11b and interposed between the spline portion and the spline nut 20 to roll along the straight grooves 11b. Namely, the ball screw-spline shaft 10 forwardly moves along the ejector axis 100 from a retracted position shown in FIG. 1 in which the distal end of the molded article-ejecting portion 11a is almost flush with the mold attaching surface 1a of the movable platen 1. As a result, the molded article-ejecting portion 11a is brought into contact with the molded article in the mold, not shown. Thereafter, when the shaft 10 has moved over the ejector stroke from the start of ejector operation, the molded article is pushed out by the ejecting portion 11a from the mold.

After the molded article is pushed out, the motor 51 is rotated in a reverse direction, whereby the ball screw-spline shaft 10 is retracted. When the shaft 10 reaches the retracted position shown in FIG. 1, the motor 51 is stopped and the molded article ejection process ends.

Figure 2:
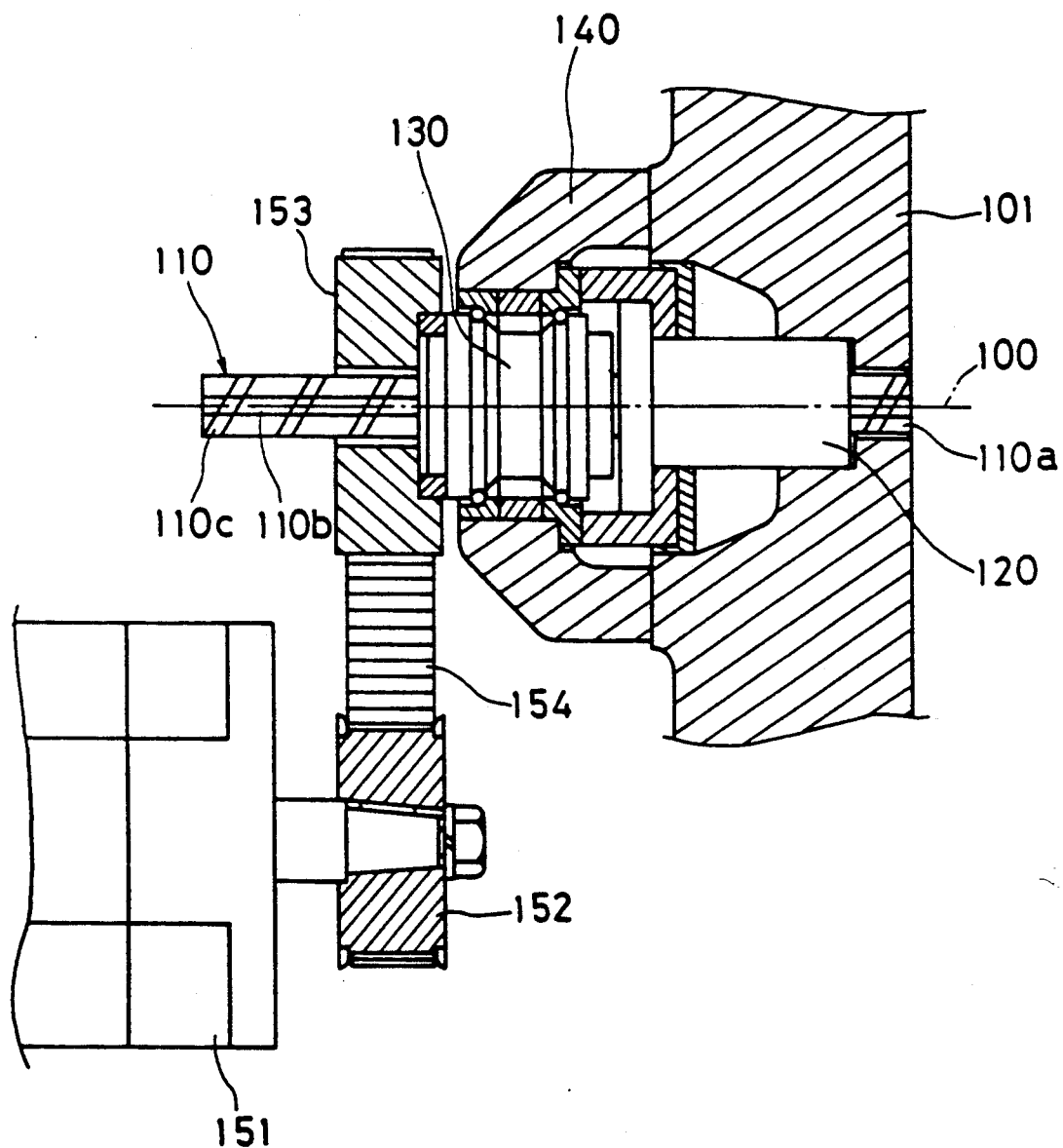
FIG. 2 is a view, similar to FIG. 1, illustrating an ejector mechanism according to a second embodiment of the present invention.
Figure 3:
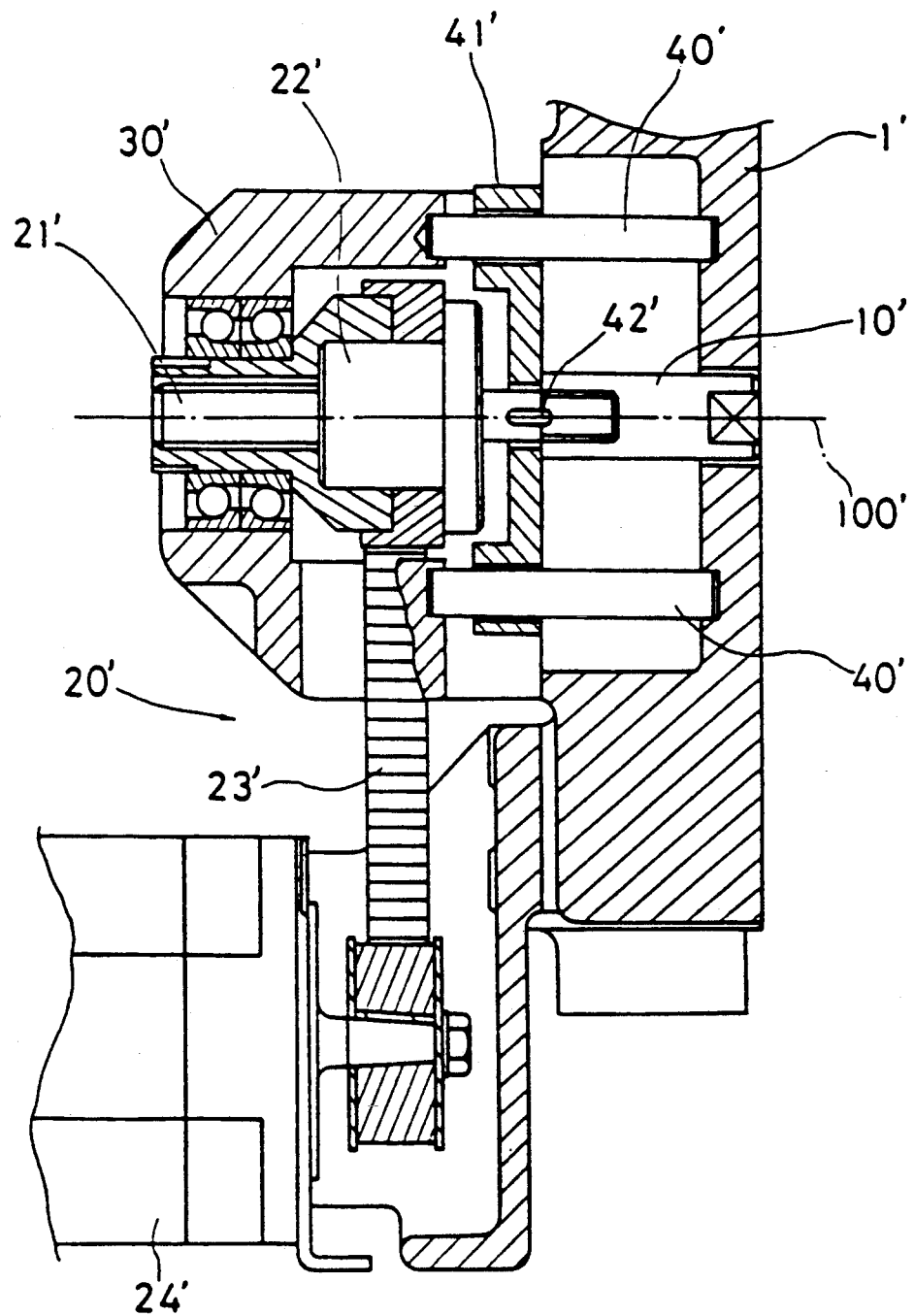
FIG. 3 is a view, similar to FIG. 1, illustrating a conventional ejector mechanism.

Referring next to FIG. 2, an ejector mechanism according to a second embodiment of the present invention will be described.

The ejector mechanism shown in FIG. 2 is characterized by its compactness, as compared with the ejector mechanism of FIG. 1. That is, instead of the ball screw-spline shaft 10 shown in FIG. 1 in which the spline portion 11 and the ball screw portion 12 are axially contiguous to each other, the ejector mechanism of FIG. 2 uses a ball screw-spline shaft 110 in which a spline portion and a ball screw portion are arranged in an axially overlapped manner, and a ball spline nut 120 and a ball nut 130 are arranged close to each other. Accordingly, the length of the shaft 110, which determines the substantial axial length of the ejector mechanism, is shorter than that of the shaft 10 by an amount almost equal to the ejector stroke.

More specifically, a plurality of axial straight grooves 110b are axially formed in the outer peripheral surface of the ball screw-spline shaft 110 over the entire length of the shaft 110, and a helical groove 110c whose axis is in alignment with the axis of the shaft 110 is formed in the surface of the shaft 110 along its entire length. Axial spline teeth (not shown) are axially formed in the inner peripheral surface of the spline nut 120 for slidable engagement with the straight grooves 110b, and a thread (not shown) is formed on the inner peripheral surface of the ball nut 130 for slidable engagement with the helical groove 110c. First steel balls (not shown) are interposed between the shaft 110 and the spline nut 120, and second steel balls (not shown) are interposed between the shaft 110 and the ball nut 130. The depths of the straight grooves 110b and helical groove 110c and the diameters of the first and second steel balls are set to respective suitable values, such that the first steel balls are rollable along the straight grooves 110b and the second steel balls are rollable along the helical groove 110c.

For the other arrangement, the ejector mechanism shown in FIG. 2 is substantially identical with the ejector mechanism of FIG. 1. Namely, the ball screw-spline shaft 110 is supported in alignment with the ejector axis 100 by the spline nut 120 fixed to a movable platen 101, and by the ball nut 130 rotatably supported by the platen 101 through a casing 140, and a distal end portion 110a of the shaft 110 acts as the molded article-ejecting portion. Reference numerals 151 to 154 respectively denote elements corresponding to the elements 51 to 54 in FIG. 1 while reference numerals 140, 101 and 110a respectively denote elements corresponding to elements 40, 1 and 11a in FIG. 1.

The ejector mechanism of FIG. 2 operates in substantially the same manner as the ejector mechanism of FIG. 1. That is, when a motor 151 is rotated in the forward direction, the ball nut 130 is also rotated forward, and thus, the ball screw-spline shaft 110 advances. At this time, the first steel balls interposed between the shaft 110 and the spline nut 120 roll along the straight grooves 110b, and the second steel balls interposed between the shaft 110 and the ball nut 130 roll along the helical groove 110c. Then, after the molded article is pushed out from the mold by the ejecting portion 110a of the ball screw-spline shaft 110, the motor 151 is rotated in the reverse direction and hence the shaft 110 is retracted. When the retracted position as illustrated is reached by the shaft 110, the motor 151 is stopped.

The present invention is not limited to the first and second embodiments described above, and various modifications thereof may be made.

For example, although in the first embodiment, the spline nut 20 is fixed while the ball nut 30 is supported rotatably, the ball nut 30 may be fixed, with the spline nut 20 supported rotatably. A similar modification may be made for the second embodiment. Further, in the first embodiment, the ball spline portion 11 and the ball screw portion 12 are formed integrally with each other, but the ball spline portion and the ball screw portion may be fabricated separately and firmly coupled to each other. Moreover, instead of the ball spline connection as used in the first and second embodiments, slide spline connection using no steel balls may be employed. Furthermore, the transmission mechanism composed of the toothed pulleys and the timing belt may be replaced by a different transmission mechanism.

We claim:

1. An ejector mechanism installed in an injection molding machine having a movable platen, comprising:
   a ball screw-spline shaft having a ball screw portion, a spline portion integral with said ball screw portion, and a distal end portion extending through the movable platen and serving as a molded article-ejecting portion;
   a ball nut threadedly engaged with said ball screw portion;
   a spline nut spline-fitted on said spline portion; and
   a drive mechanism;
   wherein one of said ball nut and said spline nut is fixed to the movable platen, and the other of said ball nut and said spline nut is rotatably supported by the movable platen and drivingly coupled to said drive mechanism.

2. An ejector mechanism according to claim 1, wherein said ball screw portion and said spline portion of said ball screw-spline shaft are disposed in a manner extending along an axis of said ball screw-spline shaft and are contiguous to each other.

3. An ejector mechanism according to claim 1, wherein said ball screw portion and said spline portion of said ball screw-spline shaft are arranged in a manner overlapped to each other and extending along an axis of said ball screw-spline shaft.

* * * * *